US012551203B2

(12) United States Patent
Chin et al.

(10) Patent No.: US 12,551,203 B2
(45) Date of Patent: Feb. 17, 2026

(54) CATHETER WITH VESSEL LINING FOR CELL COLLECTION AND METHODS FOR USING SAME

(71) Applicant: CELLAPAX CORPORATION, Barnstable, MA (US)

(72) Inventors: Albert K. Chin, Palo Alto, CA (US); Michael Glennon, Norwell, MA (US)

(73) Assignee: CELLAPAX CORPORATION, Barnstable, MA (US)

( * ) Notice: Subject to any disclaimer, the term of this patent is extended or adjusted under 35 U.S.C. 154(b) by 514 days.

(21) Appl. No.: 16/235,624

(22) Filed: Dec. 28, 2018

(65) Prior Publication Data

US 2020/0205795 A1    Jul. 2, 2020

(51) Int. Cl.
A61B 10/04    (2006.01)
A61M 25/00    (2006.01)
A61M 25/10    (2013.01)

(52) U.S. Cl.
CPC ..... *A61B 10/04* (2013.01); *A61M 2025/0004* (2013.01); *A61M 2025/1065* (2013.01)

(58) Field of Classification Search
CPC ........... A61B 10/04; A61B 2010/0216; A61M 2025/0004; A61M 2025/1065; A61M 25/1006; A61M 2025/1086
See application file for complete search history.

(56) References Cited

U.S. PATENT DOCUMENTS

| 3,168,092 A * | 2/1965 | Silverman | A61B 46/13 600/7 |
|---|---|---|---|
| 3,664,328 A | 5/1972 | Moyle et al. | |
| 3,669,099 A | 6/1972 | Silverman | |
| 3,831,587 A | 8/1974 | Boyd | |
| 3,911,927 A | 10/1975 | Rich et al. | |
| 4,043,345 A | 8/1977 | Kramann et al. | |
| 4,109,659 A | 8/1978 | Sheridan | |
| 4,243,040 A | 1/1981 | Beecher | |
| 4,254,774 A | 3/1981 | Boretos | |
| 4,271,839 A | 6/1981 | Fogarty et al. | |
| 4,324,262 A | 4/1982 | Hall | |
| 4,360,609 A | 11/1982 | Reineke et al. | |
| 4,467,816 A * | 8/1984 | Schluter | A61B 10/04 600/569 |
| 4,493,711 A | 1/1985 | Chin et al. | |
| 4,526,175 A | 7/1985 | Chin et al. | |

(Continued)

FOREIGN PATENT DOCUMENTS

| CN | 103285498 A | 9/2013 |
|---|---|---|
| EP | 0227583 A2 | 7/1987 |

(Continued)

OTHER PUBLICATIONS

International Search Report and Written Opinion in International Application No. PCT/US2019/068691 mailed Mar. 10, 2020.

*Primary Examiner* — Rene T Towa
(74) *Attorney, Agent, or Firm* — Greenberg Traurig, LLP; Chinh H. Pham; Joshua I. Rudawitz

(57) ABSTRACT

A system and method for cell collection within a vessel. The system including a cannula having a pathway extending from a first end to a second end, a elongated member situated longitudinally within the pathway of the cannula, a sleeve coupled to the second end of the cannula and a balloon situated within the sleeve.

21 Claims, 8 Drawing Sheets

(56) References Cited

U.S. PATENT DOCUMENTS

| | | | |
|---|---|---|---|
| 4,606,347 A | 8/1986 | Fogarty et al. | |
| 4,630,609 A | 12/1986 | Chin et al. | |
| 4,863,440 A * | 9/1989 | Chin | A61M 25/0119 604/271 |
| 4,871,358 A | 10/1989 | Gold | |
| 4,946,440 A | 8/1990 | Hall | |
| 4,960,411 A | 10/1990 | Buchbinder | |
| 4,990,138 A | 2/1991 | Bachich et al. | |
| 5,074,845 A | 12/1991 | Miraki et al. | |
| 5,163,927 A | 11/1992 | Woker et al. | |
| 5,171,305 A | 12/1992 | Schickling et al. | |
| 5,191,899 A | 3/1993 | Strickland et al. | |
| 5,231,992 A | 8/1993 | Leon | |
| 5,295,960 A | 3/1994 | Aliahmad et al. | |
| 5,364,345 A | 11/1994 | Lowery et al. | |
| 5,374,247 A | 12/1994 | Lowery et al. | |
| 5,389,089 A | 2/1995 | Bauer et al. | |
| 5,422,273 A | 6/1995 | Garrison et al. | |
| 5,458,573 A | 10/1995 | Summers | |
| 5,472,419 A | 12/1995 | Bacich | |
| 5,524,634 A | 6/1996 | Turkel et al. | |
| RE35,312 E | 8/1996 | Christoudias | |
| 5,601,581 A * | 2/1997 | Fogarty | A61B 17/00008 606/159 |
| 5,630,797 A | 5/1997 | Diedrich et al. | |
| 5,702,413 A | 12/1997 | Lafontaine | |
| 5,702,417 A * | 12/1997 | Hermann | A61B 17/0218 604/96.01 |
| 5,738,109 A | 4/1998 | Parasher | |
| 5,762,069 A | 6/1998 | Kelleher et al. | |
| 5,997,547 A | 12/1999 | Nakao et al. | |
| 6,039,721 A | 3/2000 | Johnson et al. | |
| 6,042,578 A | 3/2000 | Dinh et al. | |
| 6,383,805 B1 | 5/2002 | Latimer | |
| 6,478,807 B1 | 11/2002 | Foreman | |
| 6,514,224 B1 | 2/2003 | Anapliotis | |
| 6,723,113 B1 | 4/2004 | Shkolnik | |
| 6,767,338 B2 | 7/2004 | Hawk et al. | |
| 6,979,290 B2 | 12/2005 | Mourlas et al. | |
| 7,144,407 B1 | 12/2006 | Lasersohn | |
| 7,494,485 B2 | 2/2009 | Beck et al. | |
| 7,794,447 B2 | 9/2010 | Dann et al. | |
| 8,152,739 B1 | 4/2012 | McCully | |
| 8,343,170 B2 | 1/2013 | Massicotte et al. | |
| 8,491,519 B2 | 7/2013 | Chin | |
| 8,529,581 B2 | 9/2013 | Massicotte et al. | |
| 8,556,851 B2 | 10/2013 | Hirszowicz et al. | |
| 8,657,849 B2 | 2/2014 | Parker | |
| 8,668,654 B1 | 3/2014 | Gerrans et al. | |
| 8,827,951 B2 | 9/2014 | Besser et al. | |
| 8,894,680 B2 | 11/2014 | Hirszowicz et al. | |
| 8,926,559 B2 | 1/2015 | Chin | |
| 8,926,599 B2 | 1/2015 | Hoffmann | |
| 8,929,988 B2 | 1/2015 | Mitelberg et al. | |
| 9,326,790 B2 | 5/2016 | Chin et al. | |
| 9,439,662 B2 | 9/2016 | Hirszowicz et al. | |
| 9,463,035 B1 | 10/2016 | Greenhalgh et al. | |
| 9,782,570 B2 | 10/2017 | Hirszowicz et al. | |
| 9,795,408 B2 | 10/2017 | Chin | |
| 9,814,477 B2 | 11/2017 | Jensen | |
| 10,112,035 B2 | 10/2018 | Chin | |
| 10,349,957 B2 | 7/2019 | Chin et al. | |
| 10,441,755 B2 | 10/2019 | Chin et al. | |
| 11,607,234 B2 | 3/2023 | Kramer et al. | |
| 2001/0023321 A1 | 9/2001 | Gombrich et al. | |
| 2001/0044595 A1 | 11/2001 | Reydel et al. | |
| 2002/0099396 A1 | 7/2002 | Slaker et al. | |
| 2002/0120226 A1 | 8/2002 | Beck | |
| 2003/0014069 A1 | 1/2003 | Fogarty et al. | |
| 2003/0040754 A1 | 2/2003 | Mitchell et al. | |
| 2003/0055373 A1 | 3/2003 | Sramek et al. | |
| 2003/0144629 A1 | 7/2003 | Hawk et al. | |
| 2003/0208223 A1 | 11/2003 | Kleiner | |
| 2004/0030263 A1 | 2/2004 | Dubrul et al. | |
| 2004/0097788 A1 | 5/2004 | Mourlas et al. | |
| 2005/0021069 A1 | 1/2005 | Feuer et al. | |
| 2005/0049718 A1 | 3/2005 | Dann et al. | |
| 2005/0059888 A1 | 3/2005 | Sirimanne et al. | |
| 2005/0107663 A1 | 5/2005 | Saadat et al. | |
| 2005/0245876 A1 | 11/2005 | Khosravi et al. | |
| 2006/0009784 A1 | 1/2006 | Behl et al. | |
| 2006/0079924 A1 | 4/2006 | Sanders et al. | |
| 2006/0106361 A1 | 5/2006 | Muni et al. | |
| 2006/0122566 A1 | 6/2006 | Huang et al. | |
| 2007/0038227 A1 | 2/2007 | Massicotte et al. | |
| 2007/0083158 A1 | 4/2007 | Hirszowicz et al. | |
| 2007/0203506 A1 | 8/2007 | Sibbitt et al. | |
| 2007/0213753 A1 | 9/2007 | Waller | |
| 2008/0097238 A1 | 4/2008 | Loktionov et al. | |
| 2008/0135053 A1 | 6/2008 | Gruber et al. | |
| 2008/0183039 A1 | 7/2008 | Long et al. | |
| 2008/0188769 A1 | 8/2008 | Lu | |
| 2008/0245371 A1 | 10/2008 | Gruber | |
| 2008/0306499 A1 | 12/2008 | Katoh et al. | |
| 2009/0005754 A1 | 1/2009 | Soetermans | |
| 2009/0018603 A1 | 1/2009 | Mitelberg et al. | |
| 2009/0204069 A1 | 8/2009 | Hirszowicz et al. | |
| 2009/0254119 A1 | 10/2009 | Sibbitt et al. | |
| 2010/0081965 A1 | 4/2010 | Mugan et al. | |
| 2010/0161060 A1 | 6/2010 | Schaller et al. | |
| 2010/0210968 A1 | 8/2010 | Lonky et al. | |
| 2010/0234726 A1 | 9/2010 | Sirimanne et al. | |
| 2010/0249815 A1 * | 9/2010 | Jantzen | A61B 17/22031 606/159 |
| 2010/0331668 A1 | 12/2010 | Ranpura | |
| 2011/0066099 A1 | 3/2011 | Hoskins | |
| 2011/0094519 A1 | 4/2011 | Gopal et al. | |
| 2011/0172557 A1 | 7/2011 | Lonky et al. | |
| 2011/0172584 A1 * | 7/2011 | Chin | A61F 5/0076 604/8 |
| 2011/0184447 A1 | 7/2011 | Leibowitz et al. | |
| 2011/0190698 A1 | 8/2011 | Consigny et al. | |
| 2011/0213469 A1 | 9/2011 | Chin et al. | |
| 2011/0245858 A1 | 10/2011 | Milsom et al. | |
| 2011/0275990 A1 | 11/2011 | Bessder et al. | |
| 2011/0313529 A1 | 12/2011 | Schaller et al. | |
| 2012/0149983 A1 | 6/2012 | Chin | |
| 2012/0150110 A1 | 6/2012 | Chin | |
| 2012/0197157 A1 | 8/2012 | Ryan et al. | |
| 2012/0259401 A1 | 10/2012 | Gerrans et al. | |
| 2012/0302996 A1 | 11/2012 | Barash et al. | |
| 2012/0315662 A1 | 12/2012 | Linnemeier | |
| 2013/0137094 A1 | 5/2013 | Espina et al. | |
| 2013/0144329 A1 | 6/2013 | Parker | |
| 2013/0150665 A1 | 6/2013 | Hofman | |
| 2013/0172778 A1 | 7/2013 | Teschendorf | |
| 2013/0238021 A1 | 9/2013 | Gross et al. | |
| 2013/0253426 A1 | 9/2013 | Campbell et al. | |
| 2013/0267870 A1 | 10/2013 | Lonky | |
| 2013/0338533 A1 | 12/2013 | Olsen | |
| 2014/0011199 A1 | 1/2014 | Speiser et al. | |
| 2014/0066961 A1 * | 3/2014 | Chin | A61M 25/0662 606/159 |
| 2014/0088459 A1 | 3/2014 | Roush et al. | |
| 2014/0094836 A1 | 4/2014 | Feng et al. | |
| 2014/0128732 A1 | 5/2014 | Roy et al. | |
| 2014/0171828 A1 | 6/2014 | Blitzer et al. | |
| 2014/0257098 A1 | 9/2014 | DelPriore | |
| 2014/0276199 A1 | 9/2014 | O'Sullivan et al. | |
| 2014/0343593 A1 * | 11/2014 | Chin | A61M 25/09041 606/194 |
| 2015/0005781 A1 | 1/2015 | Lund-Clausen et al. | |
| 2015/0057565 A1 | 2/2015 | Mazzoli et al. | |
| 2015/0066068 A1 | 3/2015 | Hirszowicz et al. | |
| 2015/0088187 A1 | 3/2015 | Chin | |
| 2015/0088190 A1 | 3/2015 | Jensen | |
| 2015/0126966 A1 | 5/2015 | Hirszowicz et al. | |
| 2015/0133737 A1 | 5/2015 | Bacich et al. | |
| 2015/0142045 A1 | 5/2015 | Bachich | |
| 2015/0230781 A1 | 8/2015 | Loktionov et al. | |
| 2016/0074022 A1 | 3/2016 | Oliva et al. | |
| 2016/0166257 A1 | 6/2016 | Allen et al. | |
| 2016/0278747 A1 * | 9/2016 | Chin | A61B 10/0291 |
| 2017/0258618 A1 | 9/2017 | Dann et al. | |

(56) References Cited

U.S. PATENT DOCUMENTS

| | | |
|---|---|---|
| 2017/0360475 A1 | 12/2017 | Chin et al. |
| 2018/0014773 A1 | 1/2018 | Barton et al. |
| 2018/0035983 A1 | 2/2018 | Lonky |
| 2018/0104097 A1 | 4/2018 | Bacich |
| 2018/0125510 A1 | 5/2018 | Chin et al. |
| 2018/0333545 A1 | 11/2018 | Yurek et al. |
| 2019/0000429 A1 | 1/2019 | Magana et al. |
| 2019/0009058 A1 | 1/2019 | Bachich et al. |
| 2019/0125318 A1 | 5/2019 | Sarna et al. |
| 2019/0126010 A1 | 5/2019 | Sarna et al. |
| 2020/0023162 A1 | 1/2020 | Bacich et al. |
| 2020/0305851 A1 | 10/2020 | Gilbert |
| 2020/0323520 A1 | 10/2020 | Greenhalgh et al. |
| 2020/0330082 A1 | 10/2020 | Chin et al. |
| 2020/0390454 A1 | 12/2020 | Chin et al. |

FOREIGN PATENT DOCUMENTS

| | | | |
|---|---|---|---|
| EP | 0359489 | A2 | 3/1990 |
| EP | 0227583 | B1 | 8/1992 |
| EP | 0746227 | B1 | 7/2004 |
| EP | 1494524 | B1 | 1/2005 |
| EP | 2979722 | A3 | 4/2016 |
| GB | 1482873 | A | 8/1977 |
| JP | S50149171 | A | 11/1975 |
| JP | S58500694 | A | 5/1983 |
| JP | S59501149 | A | 7/1984 |
| JP | S62170260 | A | 7/1987 |
| JP | 2001238957 | A | 9/2001 |
| JP | 2008161239 | A | 7/2008 |
| JP | 6506130 | B2 | 4/2019 |
| WO | 1982003989 | A1 | 11/1982 |
| WO | 1984000113 | A1 | 1/1984 |
| WO | 2000007657 | A1 | 2/2000 |
| WO | 2001083017 | A1 | 11/2001 |
| WO | 2003084584 | A2 | 10/2003 |
| WO | 2003084584 | A3 | 2/2004 |
| WO | 2011088381 | A1 | 7/2011 |
| WO | 2012048142 | A1 | 4/2012 |
| WO | 2017205001 | A1 | 11/2017 |

* cited by examiner

CATHETER WITH VESSEL LINING FOR CELL COLLECTION AND METHODS FOR USING SAME

BACKGROUND

Taking all samples from within body cavities and vessels can be used for pretreatment diagnosis. Typically, samples can be collected during endoscopic procedures using a combination of tools including needles, forceps, etc. These systems and tools, however, can require significant skill to target and collect a sample, and in some instances, can cause damage to the targeted tissue. Accordingly, it would be desirable to have a system that can safely and easily obtain cell samples from targeted tissue.

SUMMARY OF THE INVENTION

In some embodiments, a system for cell collection within a vessel is provided. The system can include a cannula having a pathway extending between a first end and a second end of the cannula, an elongated member situated longitudinally within the pathway of the cannula, and having a distal end, an inverted balloon situated within the cannula and being coupled at one end of the distal end of the elongated member and coupled at an opposing end of the second end of the cannula to permit eversion of the balloon when the elongated member is advanced, and an inverted sleeve situated within the balloon and being attached at one end adjacent to the second end of the cannula, such that upon eversion of the balloon from the cannula, the sleeve is also everted.

In some embodiments, the elongated member can include a conduit along its length to permit a device to extend along the length of the elongated member. The balloon can be in fluid communication with the pathway and configured to receive pressurizing fluid from the pathway for eversion out from the second end of the cannula. The sleeve can be configured to evert from the second end of the cannula upon pressurization of the balloon. The sleeve can be sufficiently longer than the balloon such that the sleeve is partially everted from the cannula when the balloon is fully everted from the cannula. The sleeve can be sufficiently shorter than the balloon such that the sleeve is fully everted from the cannula when the balloon is fully everted from the cannula.

In some embodiments, a surface on a second portion of the sleeve can include at least one of a textured surface, an adhesive surface, and an open mesh surface. The cannula can be sufficiently flexible to be advanced through a vessel in a body. The balloon can have a diameter sufficiently large to press the sleeve against the inner walls of a body structure for cell collection. The system can further include a fluid tight seal configured to provide frictional force between the cannula and the elongated member. The system can further include an inflation port in fluid communication with the pathway of the cannula and the balloon. The elongated member can be configured to move longitudinally within the pathway of the cannula. The system can further include a sheath axially located about an exterior surface of the cannula.

In some embodiments, a method for cell collection within a vessel is provided. The method can include placing a cannula within the vessel within a body. The cannula can include a pathway extending between a first end and a second end of the cannula, an elongated member situated longitudinally within the pathway of the cannula, and having a distal end, an inverted balloon situated within the cannula and being coupled at one end of the distal end of the elongated member and coupled at an opposing end of the second end of the cannula, and an inverted sleeve situated within the balloon and being attached at one end adjacent to the second end of the cannula, such that upon eversion of the balloon from the cannula, the sleeve is also everted. The method can also include everting at least a portion of the sleeve out the second end of the cannula, initiating contact between a surface of the sleeve and a sidewall of the vessel, and collecting sample cells on the surface of the sleeve.

In some embodiments, the method can further include pressurizing the balloon by inputting fluid into the pathway. The method can further include everting the pressurized balloon by pushing the elongated member longitudinally toward the second end of the cannula. The at least the portion of the can be is everted by the everting balloon. The sleeve can be partially everted from the pathway of the cannula. The method can further include reinverting the sleeve within the pathway of the cannula. The sleeve can be fully everted from the pathway of the cannula. The method can further include depressurizing the balloon and positioning a sheath over the sleeve.

DETAILED DESCRIPTION

In accordance with various embodiments of the present invention, systems and methods are provided for cell collection within a body of an object, for instance, a human or animal. The systems and methods described below may also, in some instances, be used to collect cell samples from within vessels, including arteries, veins, ureters, urethra, Fallopian tubes, pancreatic ducts, nasal sinuses, or any luminal structures or cavities in the body.

Figure 1:
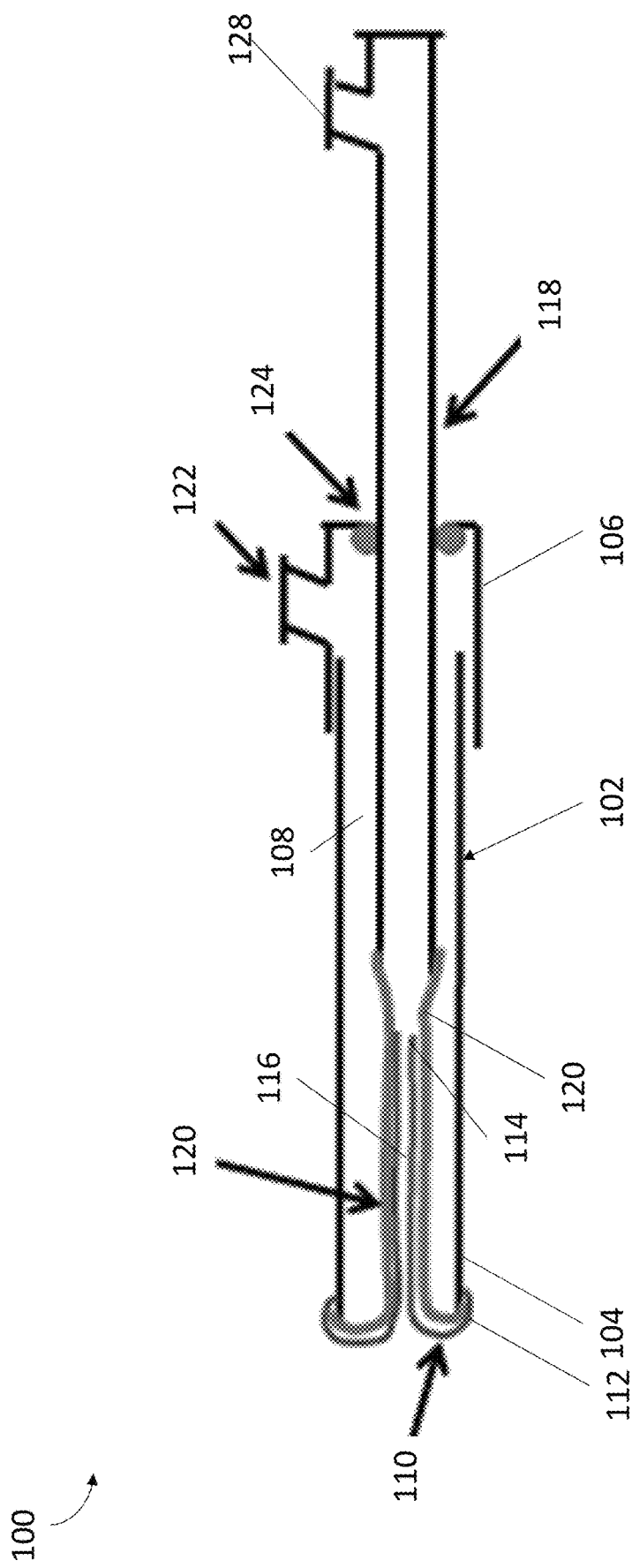
FIGS. 1, 2A, and 2B illustrate a system for collecting cell samples, in accordance with an embodiment of the present invention.

FIG. 1 depicts an example implementation of a system 100 in accordance with the present invention. In some embodiments, the system 100 can include a cannula 102 configured to house various components of the system 100. The cannula 102 can include a proximal end 104, a distal end 106, and a pathway 108 extending therebetween. The pathway 108, in an embodiment, can extend longitudinally through the entirety of the cannula 102. To the extent desired, pathway 108 can extend along a portion of the cannula 102. In some embodiments, the cannula 102 can include openings at both ends of the pathway 108. The cannula 102 can have any desired length, depending upon the application, so long as the cannula 102 can be advanced through a vessel to a target site for cell sampling. For example, in one embodiment, the cannula 102 may be relatively long so that it can be advanced through a long or tortuous vessel or body cavity to a target site for cell sampling. In another embodiment, the cannula 102 may be a relatively short for ease of maneuverability. The cannula 102 may also have any diameter sufficient to allow the cannula 102 to fit within a vessel, depending upon the application. In an embodiment, the diameter of the cannula 102 may remain substantially constant throughout. If desired, the diameter of the cannula 102 may vary, as necessary, along the length of the cannula 102.

In some embodiments, since the cannula 102 is designed to be inserted into vessels of a human or animal body, the cannula 102 can be sufficiently rigid in the longitudinal direction and flexible in a radial direction to assist in navigating torturous pathways. Similarly, the cannula 102 can be made from a material that is biocompatible. The biocompatibility of the material may help minimize occurrence of adverse reactions due to use of the cannula 102 within a vessel. Examples of suitable materials include various types of metals, plastics, or any other materials. In some instances, cannula 102 may also be made from a bioabsorbable material so that cannula 102 may remain in the body to be absorbed by the body over time.

In some embodiments, the cannula 102 can include a sleeve 110 for use in collecting cell samples. In some embodiments, the sleeve 110 can be coupled at one end 112 at the distal end 104 of the cannula 102. For example, the sleeve 110 can be coupled to the end of the cannula 102, adjacent to the end of the cannula 102, and/or attached to the balloon 120 at the end of the cannula 102. The sleeve 110 can be configured to extend from an inverted position within the pathway 108 of the cannula 102 to an everted position outside of the cannula 102, as discussed in greater detail herein. The sleeve 110 can further include an opposing end 114, and a pathway 116 between ends 112 and 114. In some embodiments, while end 112 of the sleeve 110 can be coupled at the distal end 104 of the cannula 102, end 114 of the sleeve 110 can be unattached and/or open.

The sleeve 110, in some embodiments, can include any size and shape designed to accommodate the components of the present invention. For example, the sleeve 110 can be substantially tubular in shape. In some embodiments, sleeve 110 may be sufficiently flexible so that it can be everted outward from within the cannula 102 as so that it can navigate through a tortuous path in a vessel. The sleeve 110 may also have any desired length, depending upon the application, so long as sleeve 110 can be advanced from the cannula 102 to the target site for cell sampling. For example, in one embodiment, sleeve 110 may be relatively long so that it can be advanced through a long or tortuous vessel to a target site for cell sampling. In another embodiment, the sleeve 110 may be a relatively short sleeve for more control. The sleeve 110 may also have any diameter sufficient to allow the sleeve 110 to fit within a vessel or cavity of interest, depending upon the application and the size of the vessel or cavity. In an embodiment, the diameter of the sleeve 110 may remain substantially constant throughout. If desired, the diameter of the sleeve 110 may vary, as necessary, along the length of the sleeve 110.

In some embodiments, the sleeve 110 can include a coating on its outer surface to assist in the collection of cells. In some embodiments, the coating can reduce friction between the sleeve 110 and the tissue wall upon eversion while maintaining cell collecting properties of the sleeve 110. In one embodiment, the coating may cover the entire outer surface of the sleeve 110. In an alternative embodiment, the coating may be locating only at the end 112 of the sleeve 110 (e.g., the portions everting outside the cannula 102). Of course, the coating may be placed onto the outer surface in other manners as well. Likewise, the sleeve 110 may include a coating on at least a portion of an inner surface of the sleeve 110 to reduce friction during eversion and reinversion. In one embodiment, the inner coating may cover the entire inner surface of the sleeve 110.

In some embodiments, portions of the sleeve 110 can be made from different materials. For instance, in one embodiment, if desired, only a portion of sleeve 110 may be made from a substantially flexible material, for example the end 112, that allows eversion, while the remainder of the sleeve 110 may be made from a less flexible material to minimize deformation of the sleeve 110 during delivery through the vessel. For example, the sleeve 110 can be constructed of a very thin (e.g. 0.0001"-0.0003" thick) fibrous or fabric material. In some embodiments, the sleeve 110 can contain a textured surface to promote adhesion of cells to its surface. Examples of textured surfaces for collection can include a surface that includes ribs, protrusions, nubs, grooves, scales, peaks and valleys or any other designs known in the art that can provide surface texture.

Alternatively, sleeve 110 can be provided with an adhesive surface or, with openings, or with an open mesh design to enhance cell collection when the sleeve 110 is in an everted position. In some embodiments, only an outer surface and/or a portion of the sleeve 110 may be provided with a cell collection surface. For example, the outer portion of the end 112 of the sleeve 110 can include cell collection surface(s). As would be appreciated by one skilled in the art, any combination of textured surfaces for capturing cells on a vessel wall could be utilized without departing from the scope of the present invention.

Since the sleeve 110 is designed to be inserted into vessels of a human or animal body, the sleeve 110 can be made from a material that is biocompatible. The biocompatibility of the material may help minimize occurrence of adverse reactions due to use of the sleeve 110 within a vessel. Examples of suitable materials include various types of polymers, plastics, or any other similar materials.

As depicted in FIG. 1, in some embodiments, the system 100 of the present invention can include a balloon 120 situated between an inner wall of the cannula 102 and the sleeve 110 to facilitate eversion of the sleeve 110 from within the cannula 102. In some embodiments, balloon 120 may be capable of exerting a compression force on the end 114 of the sleeve 110 while exerting a pushing force on the end 112 of the sleeve 110, so as to move the sleeve 110 from an inverted position to an everted position. In some embodiments, a first end of the balloon 120 can be coupled at the distal end 104 of the cannula 102 and/or the end 112 of the sleeve 110. In some embodiments, a second end of the balloon 120 can be coupled to a distal end of an elongated member 118, discussed in greater detail herein. As would be appreciated by one skilled in the art, the balloon 120 can be coupled to the cannula 102 and elongated member 118 using any means known in the art, so long as a substantially fluid-tight seal is provided. As depicted in FIG. 1, to evert the end 112 of the sleeve 110 for cell sampling, in some embodiments, the balloon 120 may be positioned within sleeve 110 such that, as it is everted, it can push against and the end 112 of the sleeve and evert the sleeve 110 either alone or in conjunction with the use of the elongated member 118.

In some embodiments, the balloon 120 can include and/or otherwise be in fluid communication with pathway 108 along which balloon 120 can be pressurized. The pathway 108, as can be appreciated, in some embodiments, a lumen (not shown) independent of pathway 108 may be coupled to balloon 120 to pressurize the balloon 120. The balloon 102, in some embodiments, can be pressurized by way of an inflation mechanism (not shown), that is in fluid communication with the cannula 102. The inflation mechanism may be a pump (e.g. a manual or automatic pump), syringe, or other device that can pressurize and/or depressurize the balloon 120 during use. In some embodiments, inflation mechanism may be coupled to an inflation port 122, which may in turn be coupled to a proximal end of cannula 102. Of course, other locations for the inflation port 122 are possible as long as fluids can enter with a sufficient force to deploy the balloon 120.

Since the balloon 120 is designed to be inserted into a human or animal body, the balloon 120 can be made from a material that is biocompatible. The biocompatibility of the material may help minimize occurrence of adverse reactions due to use of the balloon 120 within a vessel. Examples of suitable materials include various types of polymers, plastics, or any other similar materials. For example, the balloon 120 can be a high tensile strength polymer such as polyethylene terephthalate (PET), that is able to sustain high pressures (10-20 atm), allowing it to evert itself plus the sleeve 110.

The balloon 120 can further be made from any material that can aid in the eversion process. In one embodiment, the balloon 120 can be made from a material that minimizes resistance and friction so as to evert and bypass the obstruction with greater ease. For instance, the balloon 120 can be made from a material that is substantially smooth and/or has a relatively low coefficient of friction. Should it be desired, balloon 120 may further include a coating that can aid in eversion, re-inversion, or any other characteristic that may be desirable for the balloon 120. The coating may be applied to the balloon 120 on an inner surface, an outer surface, or a combination thereof.

The length of the balloon 120 may, in an embodiment, vary depending on a variety of characteristics. In certain instances, the length of the balloon 120 may be dependent on the length of the cannula 102 and/or the size and shape of the vessel 126 from which a tissue sample(s) is collected. In other instances, the length of the balloon 120 may vary depending the length of sleeve 110.

Similarly, the balloon 120 may also have any diameter desirable so long as the diameter allows the balloon 120 to fit the cannula 102 or accommodate sleeve 110. In some instances, balloon 120 may have a diameter sufficiently large so that, when everted, it can press sleeve 120 against the tissue wall of a vessel 126 for sample collection. Additionally, by pressurizing against the tissue wall of the vessel 126, the balloon 120 can prevent push-back (e.g., into the cannula 102) when the balloon 120 and/or the sleeve 110 interacts objects within the vessel 126 or the body itself. In one embodiment, the balloon 120 may have a diameter to allow the balloon 120 to substantially conform to the vessel walls when in an everted state. However, in the everted state, the diameter of the balloon 120 may also be smaller than the diameter of the sleeve 110, to minimize the likelihood of rupturing the sleeve 110. Of course, larger or smaller diameters may also be possible.

The balloon 120 may also have any shape desirable so long as the shape allows the balloon 120 to fit within the cannula 102, and to evert the sleeve 110 therefrom. In one embodiment, the balloon 120 may have a substantially tubular shape to allow the balloon 120 to substantially conform to the vessel 126. Of course, other geometric shapes are also within the scope of the present invention.

Continuing with FIG. 1, in some embodiments, the system 100 can include a elongated member 118 that can be slidably engaged with the proximal end 106 of the cannula 102 and extends longitudinally into the pathway 108 through an opening in the cannula 102 to aid in the eversion of the balloon 120 and the sleeve 110. The distal end of the elongated member 118, in some embodiments, can be coupled to the proximal end of the balloon 120. The proximal end of the balloon 120, in some embodiments, can be coupled to an internal or external surface of the elongated member 118 using any coupling method known in the art so long as a substantially fluid tight seal is established. For example, as depicted in FIG. 1, the proximal end of the balloon 120 can be adhered to the external surface of the elongated member 118. The elongated member 118 can be configured to slide longitudinally within the cannula 102 (e.g., within pathway 108) and push the proximal end of the balloon 120 toward the distal end 104 of the cannula 102. The elongated member 118, in some embodiments, can be a rod, a tube, a shaft, a sheath, or any sufficiently rigid structure extending along the longitudinal axis to allow advancement (i.e., eversion) of the balloon 120 and sleeve 110 from the cannula 102. In one embodiment, the elongated member 118 can be constructed from any combination of materials enabling the elongated member 118 to evert the balloon 120, as discussed herein. For example, the elongated member 118 can be constructed from a biocompatible similar to that of the cannula 102.

In some embodiments, the elongated member 118 can be configured to limit the extent of sleeve 110 eversion and re-inversion. By way of a non-limiting example, as the elongated member 118 can be pushed further into the cannula 102, the sleeve 110 can begin and continue to evert out of an opening in the distal end 104 of the cannula 102. In some embodiments, the elongated member 118 can be configured to travel in the longitudinal direction until it reaches a bushing or stopper (not depicted) on the cannula 102, which will act as an eversion stop. Similarly, pulling the elongated member 118 away from the distal end 104 can cause sleeve 110 to re-invert into the pathway 108 of the cannula 102. In some embodiments, sleeve 110 re-eversion may be limited to prevent tear or detachment of balloon 120 from sleeve 110 due to undue traction exerted on balloon 120 and the sleeve 110.

In some embodiments, the cannula 102 can include a fluid tight seal 124 configured to create a fluid tight seal between the elongated member 118 and the opening in the proximal end 106 of the cannula 102 that the elongated member 118 extends therethrough. The fluid tight seal 124 can include any combination of mechanical seals known in the art. For example, in some embodiments, the fluid tight seal 124 can be a sliding O-ring seal (also known as a Tuohy-Borst seal), providing on the fitting at the proximal end 106 of the cannula 102 to form a seal between elongated member 118 and inner walls of cannula 102. In some embodiments, friction created by the fluid tight seal 124 can act to control a rate that the sleeve 110 can be everted and re-inverted, as controlled by the elongated member 118. Additionally, friction can provide some restriction to the movement of the elongated member 118 and thus can minimize a sudden expulsion of the balloon 120 and sleeve 110 from within the cannula 102 in the presence of fluid pressure. Although reference is made to fluid, it should be mentioned that air, liquid, or other fluid that can be pressurized to aid in the eversion of the balloon 120 and the sleeve 110 can be used.

Figure 2A:
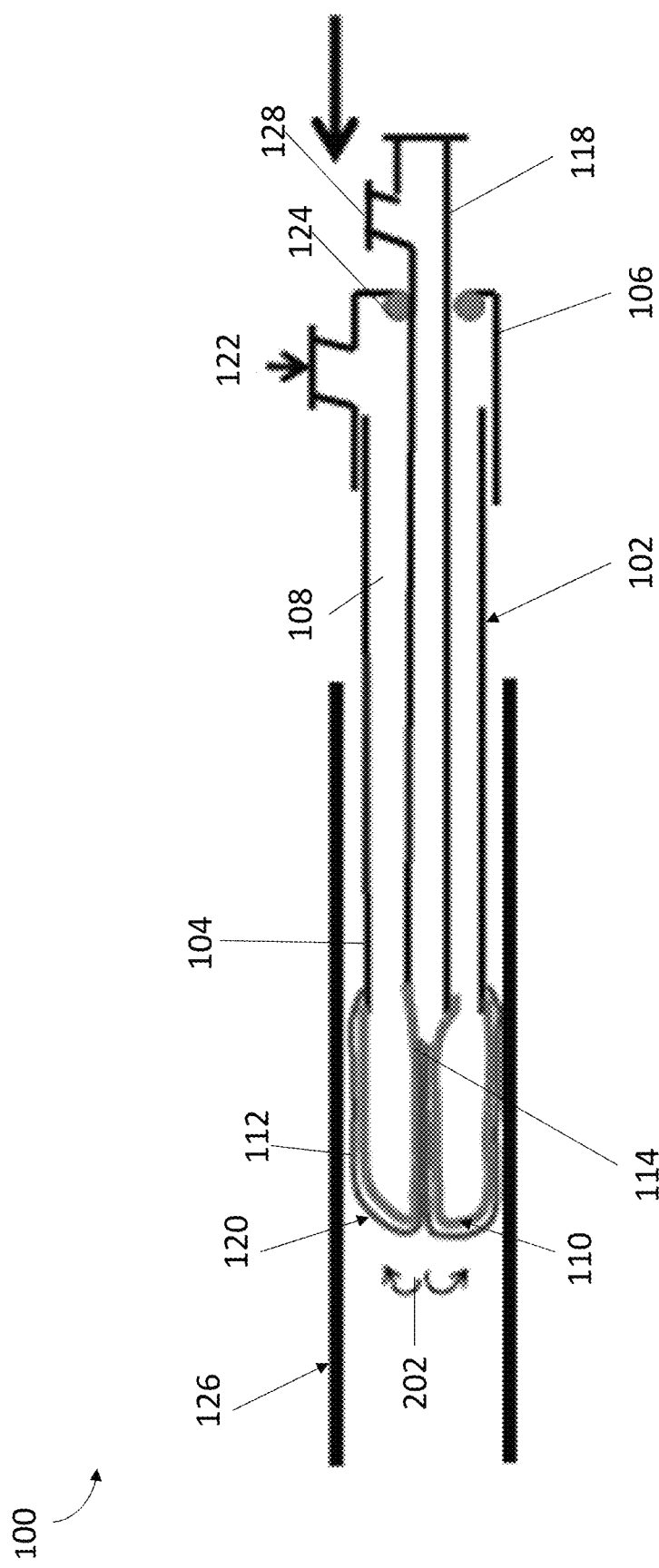
Figure 2B:
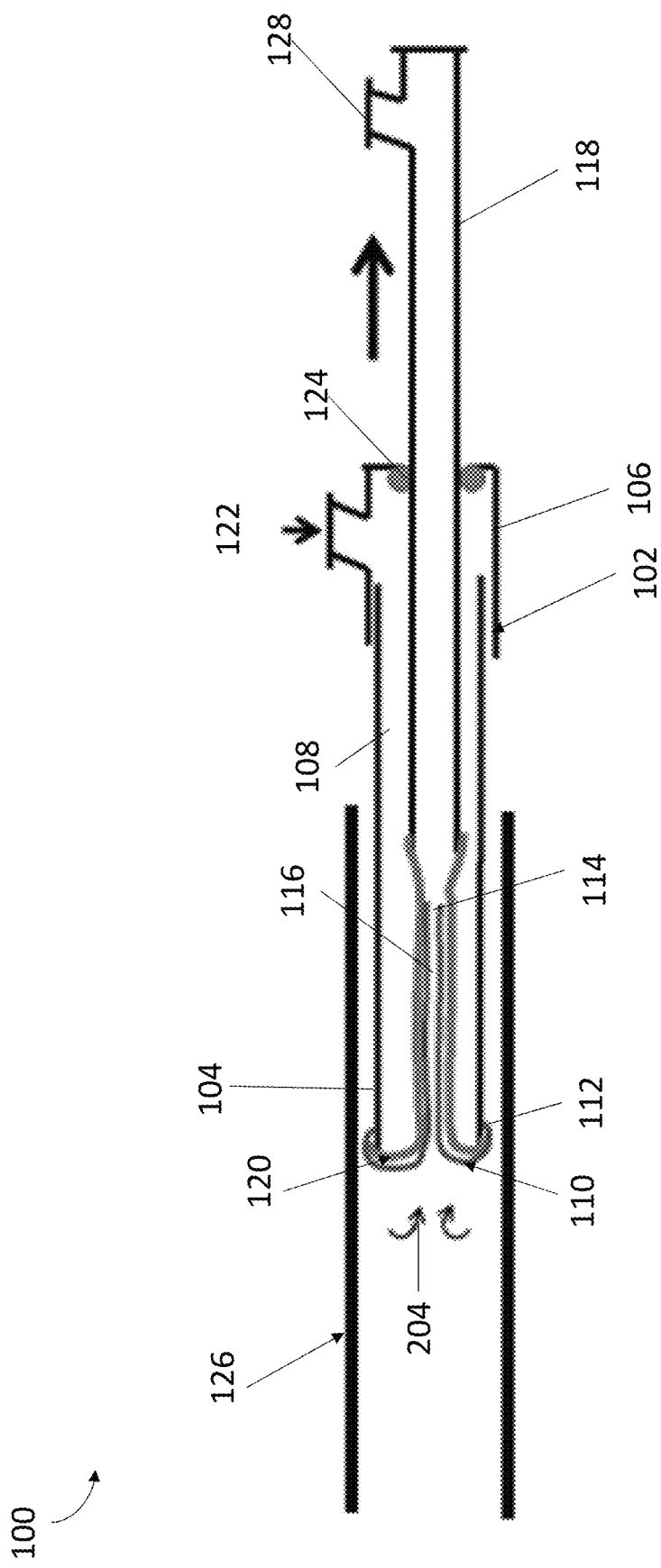

Referring to FIGS. 2A-2B, in some embodiments, the sleeve 110 can be configured to extend from an inverted position within the cannula 102 to an everted position for cell sampling the vessel 126. In particular, upon pressurization of the cannula 102 and pressurization of the balloon 120, the sleeve 110 can be everted partially out from the cannula 102 so that an outer surface of the sleeve 110 can be used to capture or otherwise obtain tissue samples. Although shown as a vessel, it should be understood that the vessel 126 can represent any passageway or cavity that the system 100 of the present invention can be utilized within for sample collection. For example, the vessel 126 can be an anatomical structure, such a vessel or cavity within a body of a subject from which cell samples are collected.

FIG. 2A depicts an exemplary state in which the sleeve 110 is everted from inside the cannula 102. Initially, sleeve 110, and balloon 120 are inverted within the cannula 102, as shown in FIG. 1. In the inverted position, the sleeve 110 and balloon 120 can be inverted and folded into the cannula 102. When the cannula 102 has been advanced to a desired location, the cannula 102 can be pressurized to begin the everting process. In some embodiments, the cannula 102 can be pressurized by introducing a fluid or gas into the pathway 108 via the inflation port 122. For example, a pressurization mechanism, such as a pump, syringe, or other device can move fluid into and out of the cannula 102 via the inflation port 122. Pressurization of the pathway 108 can cause the balloon 120 to pressurize and evert from within the cannula 102, for example, through direct contact with the fluid or gas in the pathway 108 or through a lumen in fluid communication with the balloon 120. As would be appreciated by one skilled in the art, pressurization the balloon 120 and its subsequent eversion can thereby cause the sleeve 110 to partially evert from the cannula 102.

In the embodiments shown in FIG. 2A, during pressurization of the balloon 102 and because of the partial eversion of the sleeve 110, the end 114 of the sleeve 110 can remain inside the inverted balloon 120, as shown in FIG. 2A, even though the balloon 120 is substantially completely everted. To accomplish the partial eversion of the sleeve 110, the sleeve 110 can be substantially longer than the length of the balloon 120 when the balloon 120 is fully everted from the cannula 102. Moreover, as the balloon 120 everts, it may engage with and compress the end 114 of sleeve 110, while pushing the end 112 of the sleeve 110 to cause sleeve 110 to move from an inverted position to an everted position.

In some embodiments, during the eversion process, the elongated member 118 can provide manual assistance in everting the sleeve 110. In particular, prior to pressurizing the balloon 120, the elongated member 118 can be at a first position, as depicted in FIG. 1. Thereafter, the balloon 120 can be pressurized sufficiently to stiffen the balloon 120 and allow the elongated member 118 to be pushed forward, to evert the balloon 120. With the balloon 120 sufficiently pressurized, the elongated member 118 can be manually pushed longitudinally from the first position to a second position within the cannula 102. The longitudinal movement of the elongated member 118 can push on the proximal end of the pressurized balloon 120, thus pushing the distal ends of the balloon 120 and the sleeve 110 out the distal end 104 of the cannula 102.

As discussed herein, in some embodiments, the fluid tight seal 124 can be configured to control the rate in which the elongated member 118 can be pushed into, and pulled out of, the cannula 102. As the elongated member 118 moves in the longitudinal direction toward the distal end 104 of the cannula 102, the pressurized balloon 120 and sleeve 110 can be everted out of the opening in the distal end 104 of the cannula 102, as shown by arrows 202, until balloon 120 reaches a substantially fully extended position, as shown in FIG. 2A. As the balloon 120 extends, it may engage end 112 of sleeve 110, and act to push the sleeve 110 from an inverted position to an everted position.

When everted, either on its own or through assistance from the elongated member 118, the balloon 120 can extend in a substantially straight manner, as shown in FIG. 2A, to aid in partially everting the sleeve 110 into position for sample collection. In other words, the balloon 120, and thus the sleeve 110, may have a substantially elongated shape so that, balloon 120 everts in a substantially distal direction to aid in everting the sleeve 110 toward a target sampling site. In some embodiments, once everted distally, the balloon 120 can evert radially outward to engage the inner surface of the body structure to improve sample collection. FIG. 2A depicts the system 100 with the balloon 120 and sleeve 110 everted out of the cannula 102 into the vessel 126 following an eversion process 202. While the sleeve 110 is in an everted position, the surface of the everted sleeve 110 can be configured to collect cells from the body structure to which the sleeve 110 is adjacent. As would be appreciated by one skilled in the art, while the sleeve 110 is in contact with the sample collection site, a user can move the system 100 back and forth horizontally, vertically, rotated radially, or a combination thereof to ensure proper sample collection.

In some embodiments, to minimize advancement or retreat of balloon 120 during eversion, the system 100, may include a coupling mechanism (not depicted) that may act to couple a portion of the sleeve 110 to a portion of the balloon 120. The coupling mechanism may be designed to allow eversion of the balloon 120 while minimizing advancement or retreat of the balloon 120 from within sleeve 110. Of course, in some embodiments, coupling mechanism may allow at least some axial movement of balloon 120 (e.g., during eversion) if desired. The coupling mechanism 150 may be any mechanism capable of securely coupling the balloon 120 and the sleeve 110. For instance, the coupling mechanism can include any combination of mechanisms known in the art, for example, glue, tape, Velcro, clips, or any other commercially available mechanism. In other embodiments, the coupling mechanism may be a mechanism that increases friction between balloon 120 and sleeve 110. For example, coupling mechanism may be a rough or perforated section of balloon 120 and/or sleeve 110 that creates friction when balloon 120 is everted and pressed against sleeve 110.

The everted sleeve 110 can be used to collect cells from any tubular structure in within the body of a subject or any cavity or canal. This may include, for example, an artery, a vein, a urethra, a ureter, a cystic duct, a Fallopian tube, an esophagus, small or large bowel, the nasal cavity, a duct in the breast, etc. After the samples have been collected on the sleeve 110, the sleeve 110 can be re-inverted within the cannula 102 and the system 100 can be removed for analysis or other operations.

Referring to FIG. 2B, after sample collection or other process, the sleeve 110 can be re-inverted into the cannula 102. In some embodiments, the elongated member 118 can be utilized to manually assist in the inversion process 204. During the inversion process 204, pressure may be maintained within the cannula 102 while the elongated member 118 is retracted. In particular, the balloon 120 can be slightly depressurized to allow the balloon 120 and sleeve 110 to be pulled back into the cannula 102. The pressure, in an embodiment, should be at a level that maintains compression of end 114 of sleeve 110 so as the balloon is pulled back into the cannula 102, the balloon 120 will pull the sleeve 110 with it. In some embodiments, the pressure can be at a level that imparts structure and column strength to the balloon 120 along its longitudinal axis to allow the reinversion of the balloon 120 to occur. During reinversion, the sleeve 110 can be configured to move inward without a substantial shearing motion on its surface so as to allow the surfaces of the reinverting sleeve 110 to pinch and to retain collected cells inside the cannula 102, as depicted in FIG. 2B. Such an inversion process can substantially prevent potential wash-out of the sample during removal of the system 100 from the sample site. Upon removal of the system 100 from the vessel 126, the samples collected on the sleeve 110 may be washed from the sleeve 110, recovered and analyzed. For example, upon removal of the system 100 from a blood vessel, cells samples collected on the sleeve 110 can be obtained using any known systems or methods (e.g., washing) and analyzed for abnormalities such as malignancy.

In some embodiments, a partial deflation mechanism (not shown) may assist in partially depressurizing balloon 120 as part of the inversion process 204. The deflation mechanism can partially depressurize the balloon by directing fluid out of the cannula 102 through the inflation port 122 via the channel 108 or through a lumen in fluid communication with the balloon 120. Similar to pressurization through the inflation port 122, the partial depressurization may be achieved using a pump, syringe, or other device that can move fluid into and out of cannula 102 and/or the balloon 120.

Figure 3A:
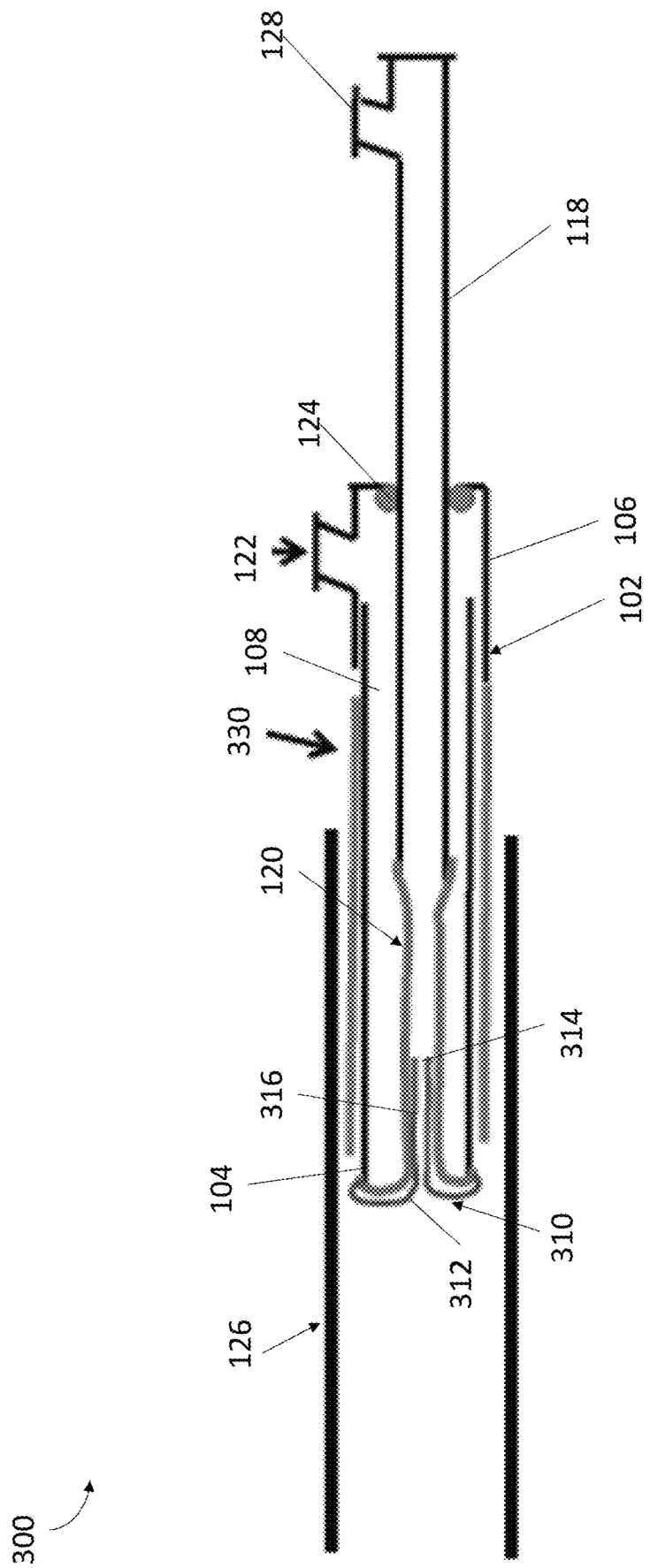
FIGS. 3A, 3B, 3C, and 3D illustrate a system for collecting cell samples, in accordance with another embodiment of the present invention.
Figure 3B:
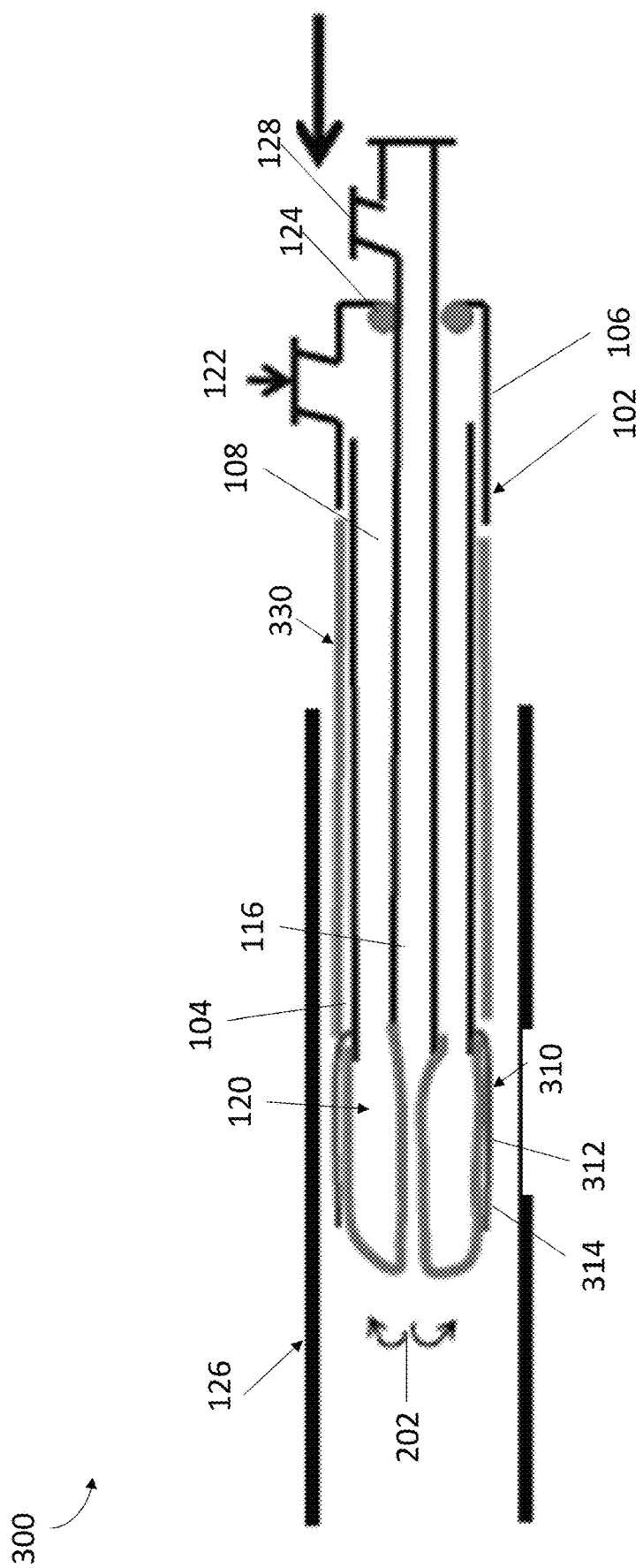

Referring to FIGS. 3A-3D, a system 300 can be provided that includes similar components as the system 100 discussed with respect to FIGS. 1-2B. However, as depicted in FIGS. 3A and 3B, the sleeve 310 can be substantially shorter than the fully everted balloon 120. However, since the sleeve 310 is substantially shorter than the fully everted balloon 120, the sleeve 310 can also be fully everted upon full eversion of the balloon 120, as depicted in FIG. 3B. More specifically, referring to FIG. 3B, when the sleeve 310 can be fully everted, the end 314 of the sleeve 310 evert distally outward from inside the cannula 102 and is not compressed by balloon 120, similar to end 314 of sleeve 310 in FIG. 2A. Even with the end 314 of the sleeve being free from the inside of the cannula 102 and balloon 120, the sleeve 310 can be used to collect samples in the same manner as discussed with respect to FIGS. 1-2B since balloon 120 can provide pressure on the sleeve 310 when the sleeve 310 is pressed and/or pushed against a tissue site for sample collection. To enhance independent movement of the sleeve 310 from the balloon 120, a coupling mechanism similar to that discussed above can be utilized.

Figure 3C:
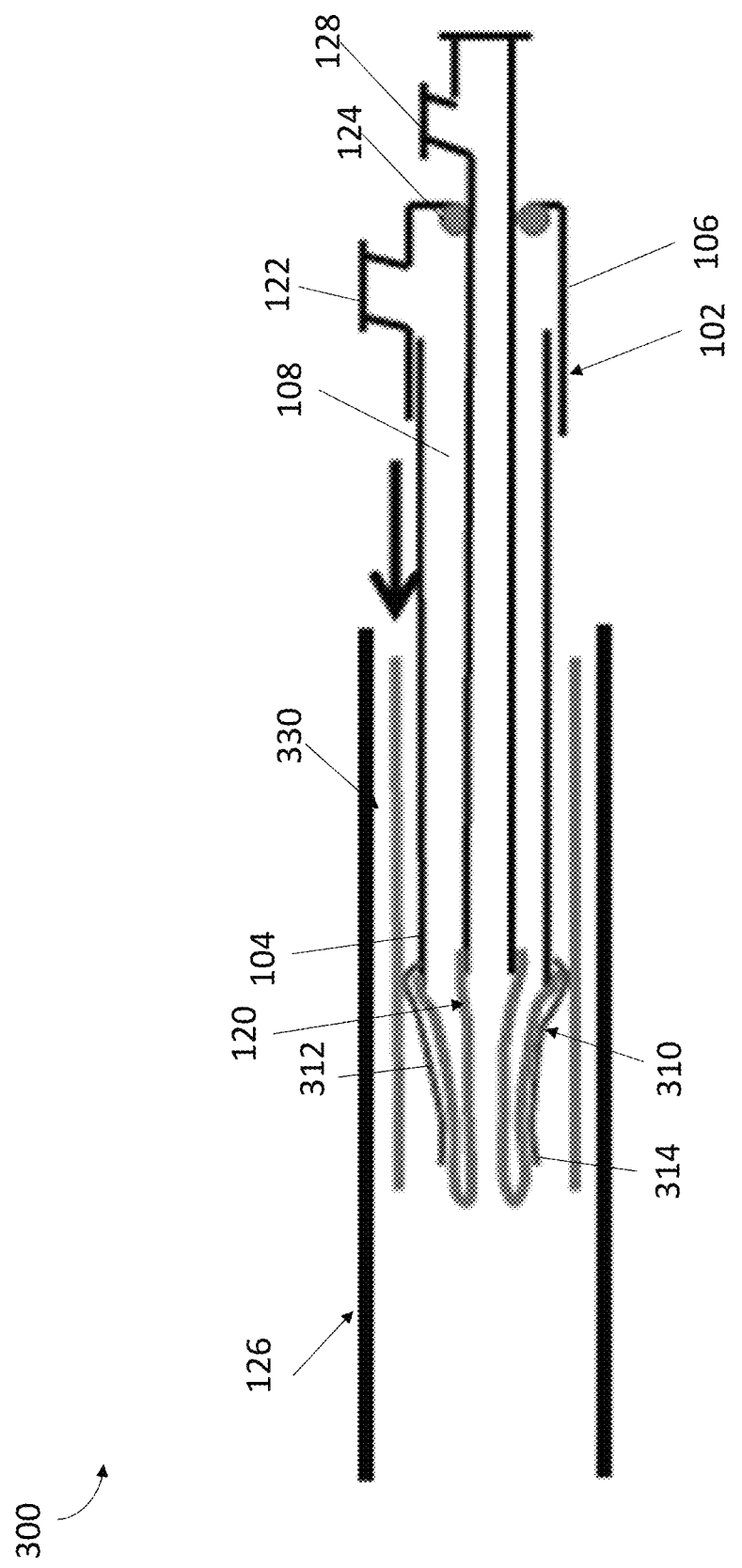

Referring to FIG. 3C, the sleeve 310 is fully everted, it may be difficult for the sleeve 310 to be reinverted within the cannula 102 once the samples are collected by the surface of the sleeve 310. In order to be protect the sleeve 310 and the sample collected from being dislodged upon removal of the system 300 from the sample site, the system 300 can include a protective mechanism that can be place over the sleeve 310 during removal of the system 300 from the body.

Still referring to FIGS. 3A-3C, in some embodiments, the system 300 can include a sheath 330 coaxially located about the exterior of the cannula 102 that can be advanced distally over the sleeve 310 to protect cell samples collected by sleeve 310 from being dislodged from the sleeve 310 during withdrawal of system 300 from the collection site. FIGS. 3A and 3B illustrate the sheath 330 in a retracted position running parallel to the exterior of the cannula 102. The sheath 330, in an embodiment, can be positioned over the outer surface of the cannula 102 and can be configured to advance distally along the exterior surface of the cannula 102. In some alternative embodiments, the sheath 330 can be located within the body of the cannula 102, or between two layers of the cannula 102 body, and slide out of the cannula 102 using any combination of known mechanical means. The sheath 330 can be sized and dimensioned such that when fully extended it can cover the sleeve 310 while in a fully everted position. The sheath 330 can be constructed from any combination of materials, for example, the sheath 330 can be constructed from a biocompatible similar to that of the cannula 102.

To protect the sleeve 310 after sample collection, the balloon 120 can be slightly depressurized and the sheath 330 can be advanced distally over the sleeve 310. In some embodiments, the balloon 120 can be configured to be depressurized by removing fluid or gas from the cannula 102 via inflation port 122. In some embodiments, during depressurization of the balloon 120, the elongated member 118 can remain extended distally into the cannula 102, as shown in FIG. 3C.

Figure 3D:
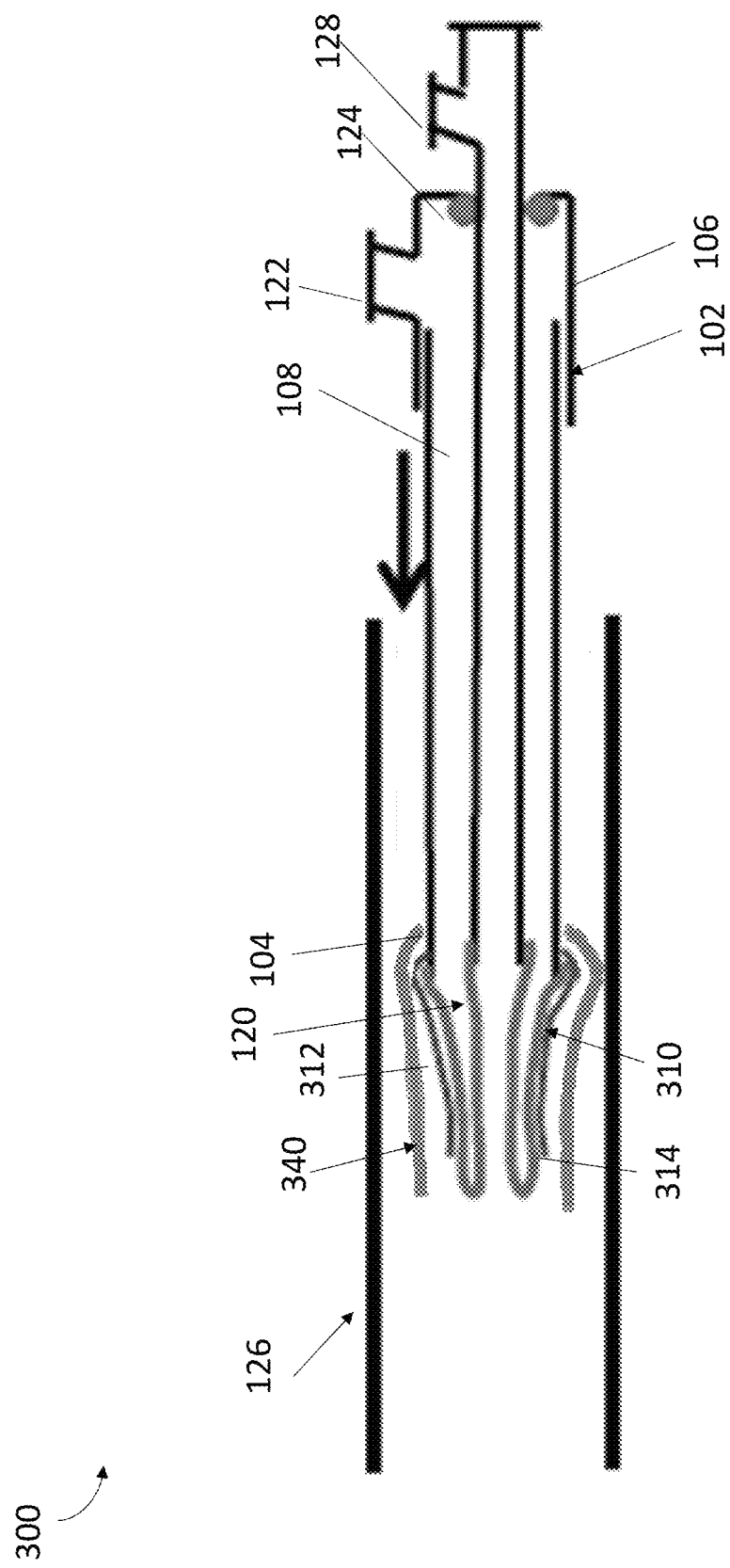

Referring to FIG. 3D, in some embodiments, another mechanism can be utilized in place of the sheath 330 to protect the everted sleeve 310. For example, a protective sleeve 340 can be everted over the sleeve 310. To evert the protective sleeve 340 over the sleeve 310, the protective sleeve 340 can be acted upon via a lumen independent of pathway 108. As would be appreciated by one skilled in the art, the sheath 330, protective sleeve 340, and/or any other protecting mechanism can be used in connection with the embodiments discussed with respect to FIGS. 1, 2A, and 2B.

In other embodiments, system 300 can be designed so that a catheter (or another device) depressurize the balloon 120 by pushing balloon 120 aside as catheter is advanced through sleeve 310. In such a design, balloon 120 may have a tapered wall so that, as a catheter pushes against a wall of balloon 120, it becomes squeezed or compressed between the catheter and the inner wall of the cannula 102. The squeezing action may depressurize the balloon 120 by pushing the fluid out of balloon 120 through the inflation port 122. Other methods of deflating balloon 120 may also be used. For example, if balloon 120 is no longer needed and/or disposable, a device may be advanced into sleeve to puncture balloon 120 so that it depressurizes.

In some embodiments, the systems 100, 300 of the present invention can be deployed, using a gastroscope (not depicted). The gastroscope may help guide the systems 100, 300 through the vessel to a site of interest. In an embodiment, the gastroscope may be provided with a body positioning designed to be situated about the cannula 102.

In some embodiments, the systems 100, 300 can be designed to allow a guidewire to help guide and direct sleeve 310 through the vessel 126. For example, a guidewire can be inserted through access port 128 in the elongated member 118 and extended through the elongated member 118, through the pathways 108, 116 in the cannula 102 and out the distal end 104 of the cannula 102. It should be noted that while the elongated member 118 is discussed in examples as being a hollow structure, as would be appreciated by one skilled in the art, the elongated member 118 can be solid depending on the desired application. In some embodiments, then sleeve 310 can be advanced along the length of guidewire until sleeve 310 is positioned adjacent to a target sampling site. It should be noted that while the guidewire can be positioned in any manner to allow guidance of the sleeve 310, its design should minimize any obstructions of the balloon 120 during eversion.

Figure 4B:
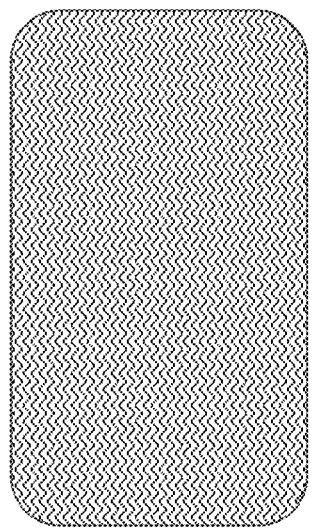
FIGS. 4A, 4B, 4C, and 4D illustrate example textures for use in accordance with an embodiment of the present invention.
Figure 4D:
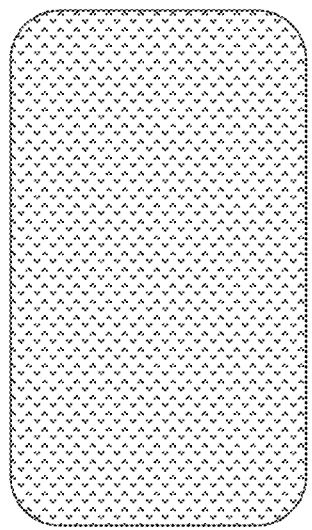
Figure 4A:
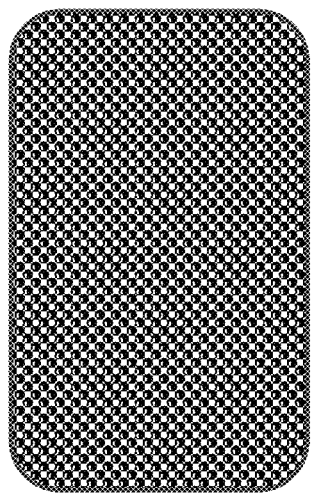
Figure 4C:
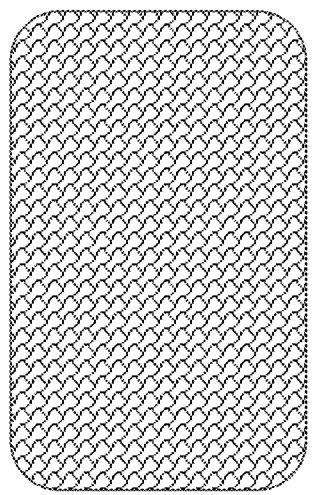

FIGS. 4A-4D depict example textures for use in accordance with the sleeve 110, 310 as discussed with respect to FIGS. 1-3D. For example, FIG. 4A depicts textured bumps, FIG. 4B depicts zig-zagging protrusions, grooves, or ribs, FIG. 4C depicts textured scales, and FIG. 4D depicts peaks or peaks and valleys.

Although the present invention is described with references to examples in the medical field, the invention is not limited to use within the medical field. The sleeve can, for instance, be can be utilized within any type of cavity or passage, such as for example a pipeline.

While the invention has been described in connection with specific embodiments, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A system for cell collection within a vessel, the system comprising:
    a cannula having a pathway extending between a first end and a second end of the cannula;
    an elongated member situated longitudinally within the pathway of the cannula, the elongated member includes a conduit having a longitudinal axis and a distal end;
    a balloon situated within the cannula and being coupled at one end to the distal end of the elongated member to permit a device to extend longitudinally though the conduit and a distal end of the balloon, and coupled at an opposing end to the second end of the cannula to permit eversion of the balloon when the elongated member is advanced, wherein the balloon has a pathway extending from the elongated member to a distal end of the balloon when the balloon is everted and inverted;
    a sleeve situated within the balloon and being affixed at one end adjacent to the second end of the cannula to permit eversion and inversion of the sleeve, such that (i) when the balloon is completely everted from the cannula, the sleeve is everted, the sleeve is detached from the balloon along the length of the balloon, and is positioned over an expanded portion of the balloon, when the balloon is everted, such that the sleeve collects cells, and (ii) when the cannula is withdrawn from the vessel, the sleeve moves and is withdrawn with the cannula; and
    a sheath co-axial with the cannula and disposed on an exterior of the cannula, the sheath being configured to be advanced distally over the sleeve to protect cell samples collected by sleeve, while the sleeve is in an inverted and everted configuration.

2. The system of claim 1, wherein the sleeve is configured to evert from the second end of the cannula upon pressurization of the balloon.

3. The system of claim 1, wherein the sleeve is sufficiently longer than the balloon such that the sleeve is partially everted from the cannula when the balloon is fully everted from the cannula.

4. The system of claim 1, wherein a surface on a second portion of the sleeve includes at least one of a textured surface, an adhesive surface, and an open mesh surface.

5. The system of claim 1, wherein the cannula is sufficiently flexible to be advanced through a vessel in a body.

6. The system of claim 1, wherein the balloon has a diameter sufficiently large to press the sleeve against inner walls of a body structure for cell collection.

7. The system of claim 6, wherein when everted, the balloon has a diameter less than a diameter of at least a portion of the sleeve.

8. The system of claim 1, further comprising a fluid tight seal configured to provide frictional force between the cannula and the elongated member.

9. The system of claim 1, further comprising an inflation port in fluid communication with the pathway of the cannula and the balloon.

10. The system of claim 1, wherein the elongated member is configured to move longitudinally within the pathway of the cannula.

11. The system of claim 1, wherein the balloon is in fluid communication with the pathway and configured to receive pressurizing fluid from the pathway for eversion out from the second end of the cannula.

12. The system of claim 1, wherein the balloon does not extend distally beyond the sleeve when everted.

13. A method for cell collection within a vessel, the method comprising:
    placing a cannula within the vessel within a body, the cannula comprising:
        a pathway extending between a first end and a second end of the cannula;
        an elongated member situated longitudinally within the pathway of the cannula, and having a conduit having a longitudinal axis and a distal end;
        a balloon situated within the cannula and being coupled at one end to the distal end of the elongated member, to permit a device to extend longitudinally though the conduit and a distal end of the balloon, and coupled at an opposing end to the second end of the cannula, wherein the balloon has a pathway extending from the elongated member to a distal end of the balloon when the balloon is everted and inverted;
        a sleeve situated within the balloon and being attached at one end adjacent to the second end of the cannula, such that upon eversion of the balloon from the cannula, the sleeve is everted from within the cannula to evert the sleeve out the second end of the cannula such that the sleeve is detached from the balloon along the length of the balloon and is positioned over an expanded portion of the balloon, when the balloon is everted; and
        a sheath co-axial with the cannula and disposed on an exterior of the cannula, the sheath being configured to be advanced distally over the sleeve, while the sleeve is in the inverted and the everted configuration;
    allowing a fully everted balloon to apply pressure to the sleeve against the vessel, such that the sleeve collects sample cells on a surface of the sleeve; and
    withdrawing the cannula, including the sleeve, from within the vessel within the body, while at least a portion of the sheath protects cell samples collected on sleeve.

14. The method of claim 13, wherein the cannula further comprises a sheath, and wherein the method further comprises sliding the sheath in a distal direction and covering the sleeve after cells have been collected.

15. The method of claim 13, further comprising pressurizing the balloon by inputting fluid into the pathway.

16. The method of claim 15, further comprising everting the pressurized balloon by pushing the elongated member longitudinally toward the second end of the cannula.

17. The method of claim 16, wherein the sleeve is partially everted from the pathway of the cannula.

18. The method of claim 17, further comprising reinverting the sleeve within the pathway of the cannula.

19. The method of claim 16, wherein the sleeve is fully everted from the pathway of the cannula.

20. The method of claim 13, wherein the balloon has a diameter sufficiently large to press the sleeve against inner walls of a body structure for cell collection.

21. The method of claim 20, wherein when everted, the balloon has a diameter less than a diameter of at least a portion of the sleeve.

\* \* \* \* \*